US009125518B2

(12) United States Patent
Piai et al.

(10) Patent No.: US 9,125,518 B2
(45) Date of Patent: Sep. 8, 2015

(54) REMOTE CONTROLLED FOOD PROCESSOR

(75) Inventors: Guido Piai, Munich (DE); Christian Probst, Munich (DE); Antoine Cahen, Lausanne (CH); Eric Granger, Lausanne (CH)

(73) Assignee: Nestec S.A., Vevey (CH)

( * ) Notice: Subject to any disclaimer, the term of this patent is extended or adjusted under 35 U.S.C. 154(b) by 314 days.

(21) Appl. No.: 13/698,590

(22) PCT Filed: May 18, 2011

(86) PCT No.: PCT/EP2011/058018
§ 371 (c)(1),
(2), (4) Date: Nov. 16, 2012

(87) PCT Pub. No.: WO2011/144647
PCT Pub. Date: Nov. 24, 2011

(65) Prior Publication Data
US 2013/0061763 A1    Mar. 14, 2013

(30) Foreign Application Priority Data
May 21, 2010   (EP) ..................................... 10163634

(51) Int. Cl.
*A47J 31/00*   (2006.01)
*A47J 31/44*   (2006.01)
(Continued)

(52) U.S. Cl.
CPC  *A47J 31/44* (2013.01); *A47J 31/52* (2013.01); *A47J 31/56* (2013.01); *A47J 31/42* (2013.01)

(58) Field of Classification Search
CPC ............ A47J 31/52; A47J 31/56; A47J 31/42
USPC ........... 99/280, 281, 282, 283, 284, 286, 290, 99/293, 323.1, 287, 348
See application file for complete search history.

(56) References Cited

U.S. PATENT DOCUMENTS 5,186,399 A  *  2/1993  Knepler et al. ................. 241/34
5,417,145 A  *  5/1995  Joseph et al. .................... 99/280
(Continued)

FOREIGN PATENT DOCUMENTS

DE     20200419    7/2002
EP     1946684     7/2008
(Continued)

OTHER PUBLICATIONS

Written Opinion and International Search Report issued Aug. 11, 2011 for PCT/EP2011/058018.
(Continued)

*Primary Examiner* — Reginald L Alexander
(74) *Attorney, Agent, or Firm* — K&L Gates LLP

(57) ABSTRACT

An apparatus (30) for conditioning a food substance, such as milk or a milk-containing substance, comprises: —a food conditioning module (31) that has a structure (32) for holding such food substance and that has an electric device (35) comprising a conditioner (36) for imparting a conditioning effect to such food substance and a conditioner control unit (37) for controlling the conditioner; and —a user-interface device (40) in data-communication with the conditioner control unit to transmit user-data from the user-interface device to the control unit for controlling the conditioner accordingly. The user-interface device (40) is external to the food conditioning module (31) and disconnectably connected thereto.

13 Claims, 5 Drawing Sheets

(51) Int. Cl.
*A47J 31/56* (2006.01)
*A47J 31/52* (2006.01)
*A47J 31/42* (2006.01)

(56) References Cited

U.S. PATENT DOCUMENTS

| | | | |
|---|---|---|---|
| 7,223,427 B2 * | 5/2007 | Knepler | 426/231 |
| 7,820,948 B1 * | 10/2010 | Renau | 219/494 |
| 2003/0079613 A1 * | 5/2003 | Williamson | 99/282 |
| 2008/0041233 A1 * | 2/2008 | Bunn | 99/281 |
| 2010/0162897 A1 * | 7/2010 | Ozanne et al. | 99/280 |

FOREIGN PATENT DOCUMENTS

| | | |
|---|---|---|
| JP | 2003007858 | 1/2003 |
| RU | 2331348 | 8/2008 |
| WO | 2009074550 | 6/2009 |

OTHER PUBLICATIONS

Japanese Office Action for Application No. P2013-510608, Dispatch No. 181494, dated Apr. 21, 2015, 7 pages.

Office Action issued in Chinese Application 201180025259.6. Mailed Sep. 12, 2014. 15 pages.

Office Action issued in Russian Application 2012155705 Mailed Dec. 10, 2014. 6 pages.

* cited by examiner

REMOTE CONTROLLED FOOD PROCESSOR

CROSS REFERENCE TO RELATED APPLICATIONS

The present application is a National Stage of International Application No. PCT/EP2011/058018, filed on May 18, 2011, which claims priority to European Patent Application No. 10163634.8, filed on May 21, 2010, the entire contents of which are being incorporated herein by reference.

FIELD OF THE INVENTION

The field of the invention pertains to an electric food processor, in particular a processor for conditioning liquid food such as heating and/or frothing milk, that has is connected to an electric power source, for instance incorporated in a beverage preparation machine.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Speciality beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. The problem with these appliances is of several natures which means that they are ill-suited to producing froth from a milk-based liquid for making a beverage. One disadvantage, for example, stems from the fact that these appliances stir a liquid or a paste in the cold state, considerably limiting their potential use. In addition, milk does not froth as convincingly when cold or at ambient temperature.

Another disadvantage stems from the fact that these appliances are ill-suited to frothing the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome.

These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

Another disadvantage with these appliances stems from the fact that frothing in these appliances is not optimal for reasons associated with the arrangement of the stirring means. Some appliances have a stirring means positioned in the middle of the tank. Such an arrangement is not efficient in quickly converting a volume of milk-based liquid into a rich froth.

Other appliances have several stirrers. These arrangements are generally mechanical with gearing means needed to coordinate the rotation of the stirrers, and this makes the system intrusive, and therefore less hygienic, increases the number of parts and makes cleaning a more painstaking operation.

U.S. Pat. No. 6,318,247 relates to an appliance for preparing hot beverages or food with stirring such as hot chocolate, for example. The appliance comprises a system for driving a stirrer of the magnetic effect type. It does, however, have several disadvantages. Firstly, in such an appliance, the liquid or froth is stirred coaxially with respect to the central axis of the tank, and this causes a circulation in which some layers of liquid or froth, particularly the peripheral layers, are not stirred as extensively as others, particularly the layers near the middle, because of the centrifuging effect produced by the stirrer. Such a circulation is therefore not suited to producing a froth of sufficient quality or to reducing the time needed to produce this froth. In addition, the structure of the appliance is not hygienic for treating a milk-based liquid and cleaning is not made any easier by such a construction. Other devices for stirring food products which have more or less the same disadvantages are described in patent documents WO 2004/043213 or DE 196 24 648.

Stirring systems with a magnetic engagement type are described in documents U.S. Pat. No. 2,932,493, DE 1 131 372, U.S. Pat. No. 4,537,332 and U.S. Pat. No. 6,712,497. None of these prior art systems provide solutions suited to producing a quality froth in a short time and hygienically.

Utility model DE 89 15 094 relates to a refrigerated pot for dispensing a milk-based beverage. The pot comprises refrigerating means and forced-convection means in the form of a magnetic rotor. Such a device is not suited to converting the liquid into a froth but simply keeps the liquid uniformly at the refrigeration temperature for preservation.

U.S. Pat. No. 3,356,349 discloses a stirring device that has a heated tank, magnetic drive means positioned under the tank for driving a hub located in the middle of the tank. The hub is associated with a stirring element which is offset with respect to the hub, causing the element an oscillatory movement. Such a principle of stirring may create a loss in magnetic coupling because of the high moment of inertia generated by the offset position of the stirring means with respect to the axis of rotation of the drive means. This problem increases with increasing speed. Such a stirring device can therefore work to stir certain liquids or other substances at low speed but may prove ill-suited to converting liquid into a froth at sufficiently high speed. Incidentally, the document does not mention the conversion of a liquid into a froth using this device.

An improved appliance for preparing froth from a milk-based liquid or milk has been proposed in WO 2006/050900 and in WO 2008/142154. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing.

More recently, it has been proposed, as described in WO 2009/074555, to provide a coffee machine with this type of milk conditioning tank.

Generally speaking, certain beverage preparation machines use capsules containing ingredients to be extracted or to be dissolved; for other machines, the ingredients are stored and dosed automatically in the machine or else are added at the time of preparation of the drink. Most coffee machines possess within a housing: filling means that include a pump for liquid, usually water, which pumps the liquid from a source of water that is cold or indeed heated through heating means, such as a heating resistor, a thermoblock or the like. EP 1 864 598 discloses such a coffee machine that is autonomous and that can be mounted onto a docking station. The beverage machine is arranged to be operable whether connected to the docking station or disconnected therefrom. EP 1 878 368 discloses a beverage machine having a functional block in a housing that is rotatably mounted on a support base. The support base has a power connector for the beverage machine that allows such rotation. The functional block can be designed to be removable from the support base. The support base may have an extension with a power connector for mounting a milk-frothing apparatus thereon. FR 2 544 185 discloses an old espresso machine in which a hot water, a steam preparation module and a plurality of different coffee preparation modules may be mechanically and electrically connected side-by-side. The aim is to provide a system with a sufficient number of parallel coffee outlets, as required for the normal use in a bar so as to permit preparation of several espressos simultaneously.

SUMMARY OF THE INVENTION

It is a preferred object of the present invention to provide an electric food processor that has an electric food processing arrangement, such as a heater and/or a stirrer, and a remote control interface.

It is a further preferred object of the invention to provide a food processor that includes an electric food processing arrangement and that is removably mountable on a powering base which base includes a user-interface for controlling the food processing arrangement.

It is another preferred object of the present invention to provide a separable assembly of a food processor and beverage preparation module in which the user-interface for the food processor and the user-interface for the beverage module are located either on the food processor or the beverage module.

The invention thus relates to an apparatus for conditioning a food substance, such as milk or a milk-containing substance. The apparatus comprises:
  a food conditioning module that has a structure for holding such food substance and that has an electric device comprising a conditioner for imparting a conditioning effect to such food substance and a conditioner control unit for controlling the conditioner; and
  a user-interface device in data-communication with the conditioner control unit to transmit user-data from the user-interface device to the control unit for controlling the conditioner accordingly.

Typically, the apparatus can be of the type used for heating and/or frothing milk and milk-like substances and other edible liquids, as for example disclosed in WO 2006/050900 and in WO 2008/142154.

For instance, the food holding structure forms a tank for containing the food substance in the form or a liquid and/or emulsion. The electric device may include as a conditioner an electromechanical impeller arrangement such as a motor-driven stirrer or whisk, for moving such liquid in the tank. Moreover, the conditioner may include an electric heating and/or cooling arrangement to heat up and/or cool down the food substance. Optionally, at least part of the conditioner for imparting a conditioning effect to said food substance is located outside the tank.

Moreover, for controlling the conditioner, the electric device may comprise a controller connected to the controller and optionally connected to sensors, such as a temperature and/or level sensor of the liquid food substance and activity sensor(s) of the conditioner.

Typically, the electrically powered parts, e.g. a controller and sensor(s), a resistive heater and/or resistive cooler and/or an electric actuator for driving an impeller forming the impeller arrangement, are located outside the tank normally in a cavity adjacent to the tank. Such motor may be arranged to drive mechanically and/or magnetically an impeller, e.g. a stirrer and or whisk, located within the tank.

For convenience, the cavity containing the electrically powered parts is located in a chamber fixed to the tank and made impervious so that the food conditioning module is washable under running water and/or in a dishwasher. A passage may be provided for the supply of electric power via a current conductor into the cavity containing the electrically powered parts. Such current conductors can be easily sealed off to prevent water and moisture infiltration into the cavity. For instance, the current conductors are in a plug-and-socket arrangement, e.g. of a STRIX® type.

The tank may be held in an outer stand. The tank and the stand, e.g. generally in the form of a container holding the thank and typically having a generally common mouth therewith, may delimit an internal cavity between the stand and the tank for housing the electric parts of the electric device. Such cavity is preferably made impervious, in particular for allowing washing of the food-conditioning module under running water and/or in a dishwasher, e.g. as disclosed in WO 2008/142154.

The controller may be programmed or otherwise configured to carry out one or more conditioning processes on the food substance on request of a user. The controller may in particular be associated with a memory device for storing the different programs that can be carried out by the controller.

Typically, the controller is in data-communication with a user-interface for the input of user-requests corresponding to such a conditioning process, e.g. frothing and/or heating milk contained in the tank. The user interface in particular includes one or more user-selectors, e.g. push and/or turn buttons, a touch-screen, touch-pad, etc. . . . .

In accordance with the invention, the user-interface device is external to the food conditioning module and disconnectably connected thereto.

Hence, as opposed to prior art apparatus in the field, e.g. as disclosed in the abovementioned WO 2006/050900 and in WO 2008/142154, the user-interface device for allowing a user to interact with the module's conditioning arrangement, such as apparent buttons or switches or selectors and like components, is separable therefrom, e.g. from the abovementioned tank and food conditioner with the controller contained in the sealed-off chamber or cavity fixed to the tank, so that the food conditioning module can be serviced, e.g. washed, without exposing an apparent user-interface and so that the module bears no or fewer areas of potential liquid and/or moisture infiltration about an apparent user-interface mounted in an outer wall of the module.

It follows that the user interface device is normally not integrated in the food conditioning module. The user-interface device may be comprised in a base station for removably receiving the food conditioning module thereon. For instance, the base station has an arrangement for mechanically mounting the module thereon, e.g. a plug-and-socket type of arrangement or a clipping arrangement, in particular a STRIX®-type arrangement.

Typically, the base station is connectable to an AC electric power source, such as the mains, the base station and the food conditioning modules comprising disconnectably connectable electric power connectors, e.g. plug-and-socket connectors such as a STRIX connector type of connector arrangement, for passing electric power from the base station to the electric device of the module, in particular to the conditioner and to the conditioner control unit.

In a preferred embodiment, the user-interface device is in data-communication with the conditioner control unit via these electric power connectors. Hence, the same connectors are used to pass electric power (for powering the electric components from the base station) and data from the base station to the electric device of the module (for controlling the module from the base station). This reduces the number of connectors and areas of possible liquid or moisture infiltration into the module, in particular about an outer user-interface that would be incorporated in the module, and the manufacturing costs.

The base station and the food conditioning module may comprise a base modulation device and a module modulation device, respectively, the modulation devices being arranged to combine and separate electric power and data generated by the user-interface device and passed via the electric power connectors. In a simple form, the modulation device for communicating a data signal via the power connector may include an electric power switch for (slightly) altering, e.g. in the form of short interruptions, the electric power passed from the base station to the module and an electric power sensor for detecting such alteration of the electric power, e.g. a current switch and a current sensor. Hence an economic reliable data communication system can be implemented that uses the same channel as the electric power between the base station and the module.

In a variation, the apparatus may comprise disconnectably connectable electric data connectors for bringing the user-interface device in data-communication with the conditioner control unit. Hence, the apparatus may include an electric power supply line and a separate electric data supply line. The user-interface device can be in wireless data-communication with the conditioner control unit, e.g. via an electromagnetic data communication arrangement such as radio or light communication arrangement.

Typically, for communicating data, the user-interface device comprises an interface control unit forming a master, the conditioner control unit forming a slave, or vice versa.

Another aspect of the invention relates to a beverage preparation machine comprising an apparatus as described above and a beverage preparation module. For instance the beverage preparation module has: a beverage outlet and a chamber for receiving a flavouring ingredient, such as a pre-portioned ingredient contained in a capsule; and a liquid circulation system for circulating a liquid through the chamber containing such ingredient and forming a flavoured beverage dispensed via the beverage outlet.

In an embodiment, the machine has a housing containing at least part of the beverage preparation module, the housing bearing a user-interface of such user-interface device and a connector for disconnectably connecting and powering the food conditioning module removably mounted on the connector.

The food conditioning module may be mechanically mounted onto the housing as disclosed in WO 2009/074555, the content of which is hereby incorporated by way of reference.

For instance, the machine is a coffee, tea or soup preparation machine bearing the apparatus of the invention. In particular, the machine is arranged for preparing within the beverage preparation module a beverage by passing hot or cold water or another liquid through a capsule containing an ingredient of the beverage to be prepared, such as ground coffee or tea or chocolate or cacao or milk powder.

BRIEF DESCRIPTION OF THE DRAWINGS

The invention will now be described with reference to the schematic drawings, wherein.

DETAILED DESCRIPTION

Figure 1:
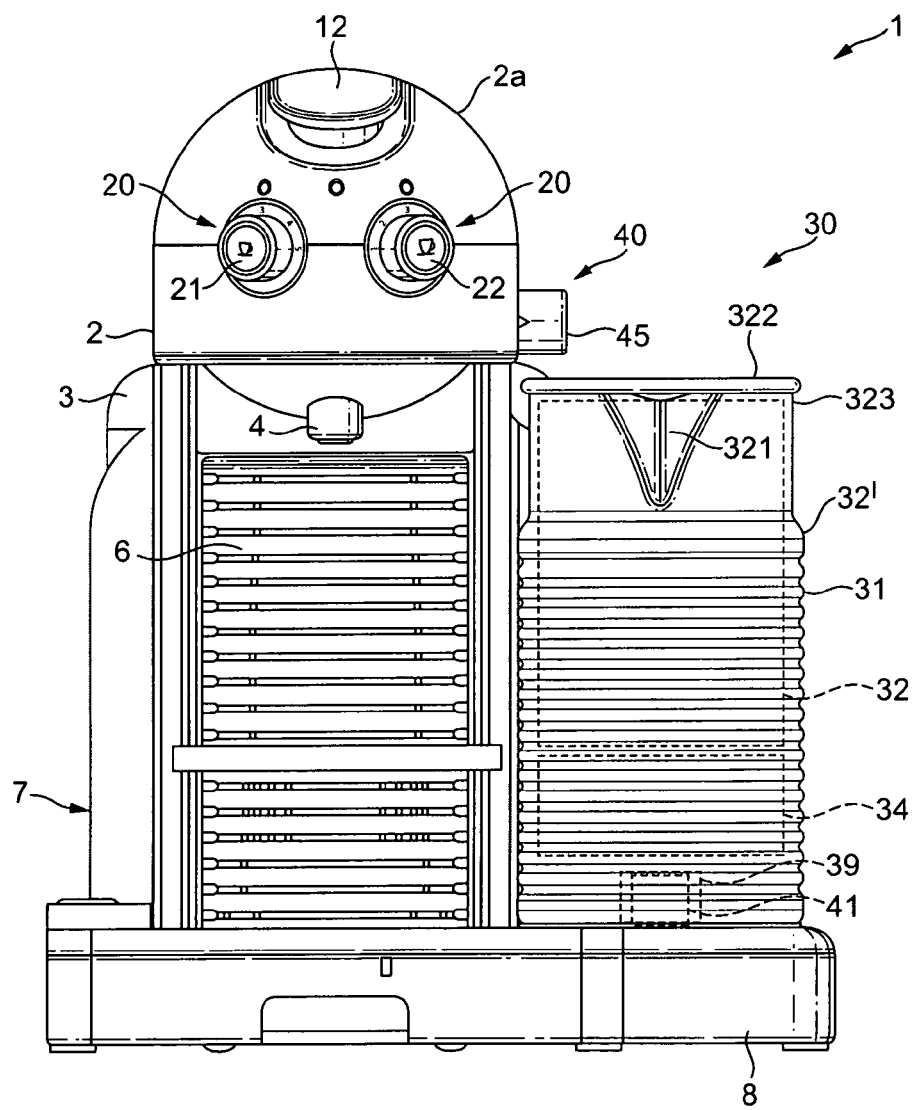
FIG. 1 is a front view of a beverage preparation machine integrating a food conditioning apparatus according to the invention.
Figure 2:
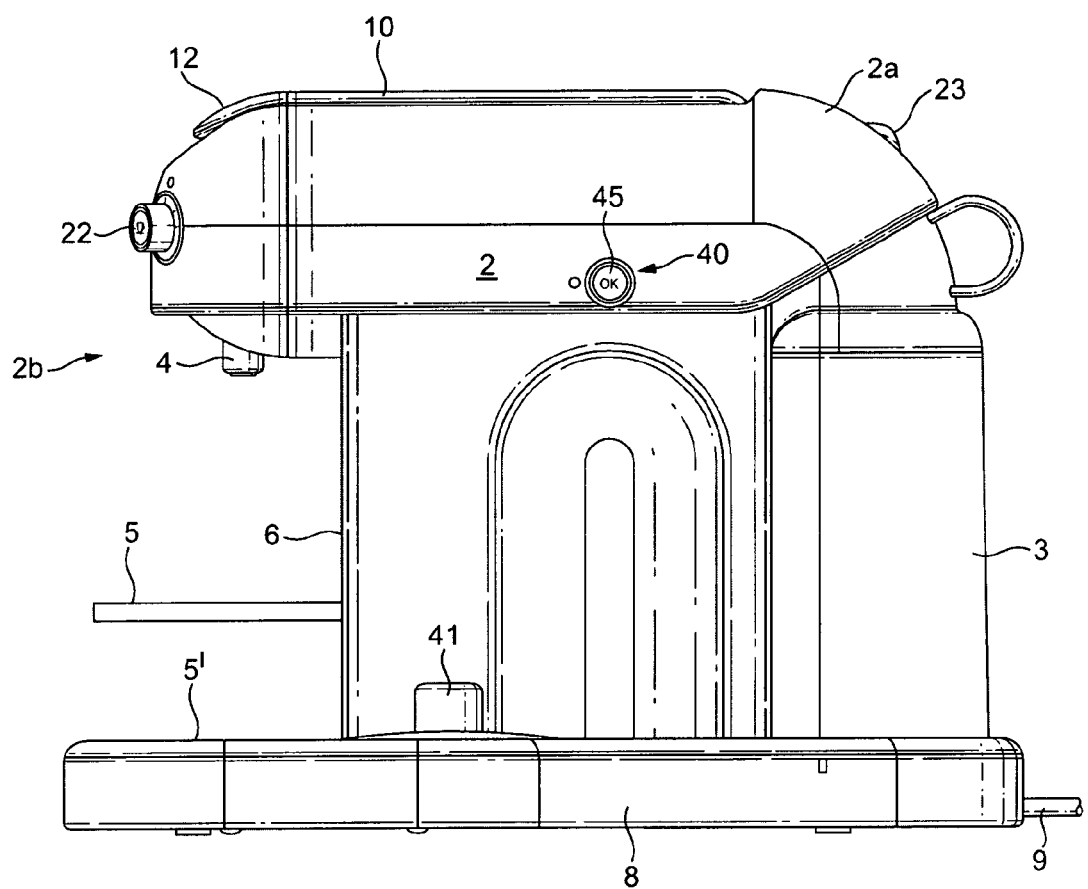
FIGS. 2 and 3 are a side view and a perspective view, respectively, of the machine of FIG. 1.
Figure 3:
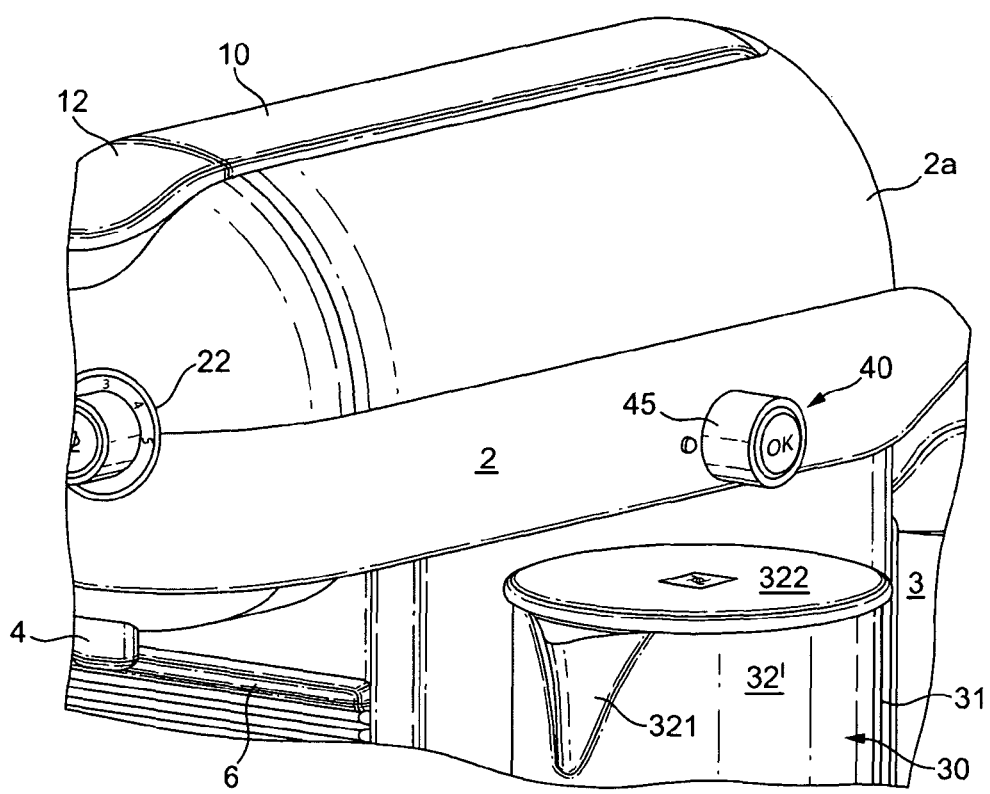

FIGS. 1 to 3 illustrate an embodiment of a beverage preparation machine 1 bearing a food conditioning apparatus 30 according to the invention including a removable food conditioning module 31. FIG. 2 illustrates machine 1 upon removal of module 31.

Machine 1 with apparatus 30 can be electrically powered, typically by the mains e.g. supplying an electric current at 220 to 240 V and 50 Hz or at 100-120 V and 60 Hz, via an electric cord 9.

Machine 1 has an internal beverage preparation module covered by a housing 2. The beverage preparation module is arranged for holding a flavouring ingredient, in particular a pre-portioned ingredient such as an ingredient supplied to such module within a capsule, and circulating a liquid therethrough to form the beverage.

The liquid, e.g. water, may be stored and supplied to the beverage preparation module from a tank 3. The beverage, upon formation, can be dispensed via an outlet 4 to a dispensing area 5,5', e.g. a support for holding a user cup or mug. The dispensing area may include a first cup support 5 that is movable away from under outlet 4 so as to give access to a lower second cup support 5' for larger cups, e.g. for dispensing lungos or extra-large beverages. The lower cup support 5' may be connected to a base 8 of machine 1. Suitable movable cup supports are for example disclosed in EP 1 867 260 and in WO 2009/074557, the contents of which are hereby incorporated by way of reference.

Adjacent to the beverage preparation module, machine 1 may have a collector 6 for used flavouring ingredient, e.g. ground coffee or tea upon brewing, for instance contained within capsules. Collector 6 may be positioned underneath the beverage preparation module to collect upon beverage preparation the used flavouring ingredient evacuated to collector 6, e.g. by gravity. Suitable collectors are for example disclosed in WO 2009/074559 and in WO 2009/135869, which are hereby incorporated by way of reference.

Machine 1 has a handle 10 movable between: a transfer position for loading the ingredient, e.g. within a capsule, into the module and/or evacuating such ingredient from the module; and a circulation position for circulating the liquid through the ingredient.

Typically, handle 10 actuates an ingredient holder with an ingredient chamber, such as a brewing unit, of the beverage preparation module from: a transfer position for insertion of the flavouring ingredient into the holder and/or evacuation of this ingredient therefrom; and a circulation position for circulating the liquid through this ingredient in the ingredient holder to form the beverage. The ingredient holder, e.g. a brewing unit, may have two relatively movable parts that are moved apart for opening the ingredient holder into the transfer position and moved together for closing the ingredient holder into the circulation position. In the circulation position, the ingredient holder may tightly enclose the flavouring ingredient to ensure proper guidance of the liquid through the ingredient.

In the circulation position illustrated in FIG. 2, handle 10 is resting on or in a top face 2a of machine 1. In particular handle 10 can be flush with housing 2.

Handle 10 can be a single-arm lever generally shaped as a straight bar that is slightly curved or bent at its extremity for ergonomic reasons, namely for facilitating the manual application of force onto handle 10 by a convenient orientation of contact surface 12 for a user's hand when handle 10 is moved from the transfer position to the circulation position. In the circulation position (FIGS. 1 to 3), handle 10 with its extremity 12 may be flush with housing 2 that has a corresponding shape, e.g. to facilitate cleaning of the surface of housing 2.

Hence, handle 10 has a drive portion 12 arranged to be contacted and driven by a human hand to move the handle between the transfer position in which the flavouring ingredient, e.g. enclosed in a capsule, is inserted into the beverage preparation module for instance via a passage (not shown) located underneath handle 10, and the circulation position in which the flavouring ingredient is housed in the beverage preparation module and liquid may be circulated therethrough to form the beverage.

In the transfer position (not shown), handle 10 is pivoted upwards to entirely uncover the ingredient insertion passage for allowing the insertion of the flavouring ingredient, e.g. within a capsule, into the beverage preparation module.

This ingredient passage can be arranged for the introduction by gravity of the flavouring ingredient into the beverage preparation module. Drive portion 12 can be located generally above and/or adjacent the passage when handle 10 is in the transfer position to facilitate the coordination between manual introduction of a flavouring ingredient, e.g. within a capsule, into passage 7 and manually actuating handle 10 using the same hand.

Furthermore, machine 1 includes a user-interface 20 for initiating circulation of the liquid through the flavouring ingredient in the beverage preparation module. User-interface 20 includes a first selector 21 for dispensing small beverages, e.g. espressos, and a second selector 22 for dispensing large beverages, e.g. lungos.

Machine 1 further includes a toggle switch 23 as a master switch on the rear part of machine 1, e.g. above tank 3.

The beverage preparation module typically includes one or more of the following components:

a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 4;

b) an in-line heater, such as a thermoblock, for heating this flow of liquid to be supplied to the ingredient holder;

c) a pump for pumping this liquid through the in-line heater;

d) one or more fluid connecting members for guiding this liquid from a source of liquid, such as tank 3 of liquid, to beverage outlet 4;

e) an electric control unit, in particular comprising a printed circuit board (PCB), for receiving instructions from a user via an interface 20,21,22 and for controlling the in-line heater and the pump; and f) one or more electric sensors for sensing at least one operational characteristic selected from characteristics of the ingredient holder, the in-line heater, the pump, liquid reservoir 3, ingredient collector 6, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099 which are hereby incorporated by way of reference.

Handle 10 and user-interface 20 can be arranged so that user-interface 20 is operable by a human hand while the hand is still in contact with drive portion 12 of handle 10 upon driving handle 10 into the circulation position.

For instance, drive portion 12 is contacted and actuatable by one or more of the index finger, middle finger, ring finger and little finger, user-interface 20 being operable by the hand's thumb while the other finger(s) is/are still in contact with handle 10, i.e. without having to move the hand away from handle 10 after moving handle 10 into its circulation position. For convenience, drive portion 12 may have a surface or profile specially adapted for being hand driven, e.g. the surface of drive portion 12 may include a means, such as a surface structure or composition, in particular an anti-skid surface that provides friction against the user's hand.

Machine 1 has a front face 2b bearing outlet 4 for delivering the beverage, user-interface 20 being located on or adjacent to front face 2b. In particular, user interface 20 is located below drive portion 12 to be easily accessible by the user's hand while still in position on drive portion 12 on handle 10 upon reaching the handle's circulation position. For instance, when handle 10 is in the circulation position, user-interface 20 is spaced from drive portion 12 by a distance in the range of 2 to 4 cm.

Machine 1 will now be discussed in greater details with reference to apparatus 30.

In the particular embodiment of FIGS. 1 to 3, apparatus 30 is configured for conditioning heating and/or frothing milk or a milk-containing liquid. This type of conditioning process, i.e. using a tank for holding the milk or milk-containing liquid and an impeller and optionally a heater for conditioning such liquid in the tank is known for example from WO2006/050900 and from WO 2008/142154 which are hereby incorporated by way of reference.

Figure 4:
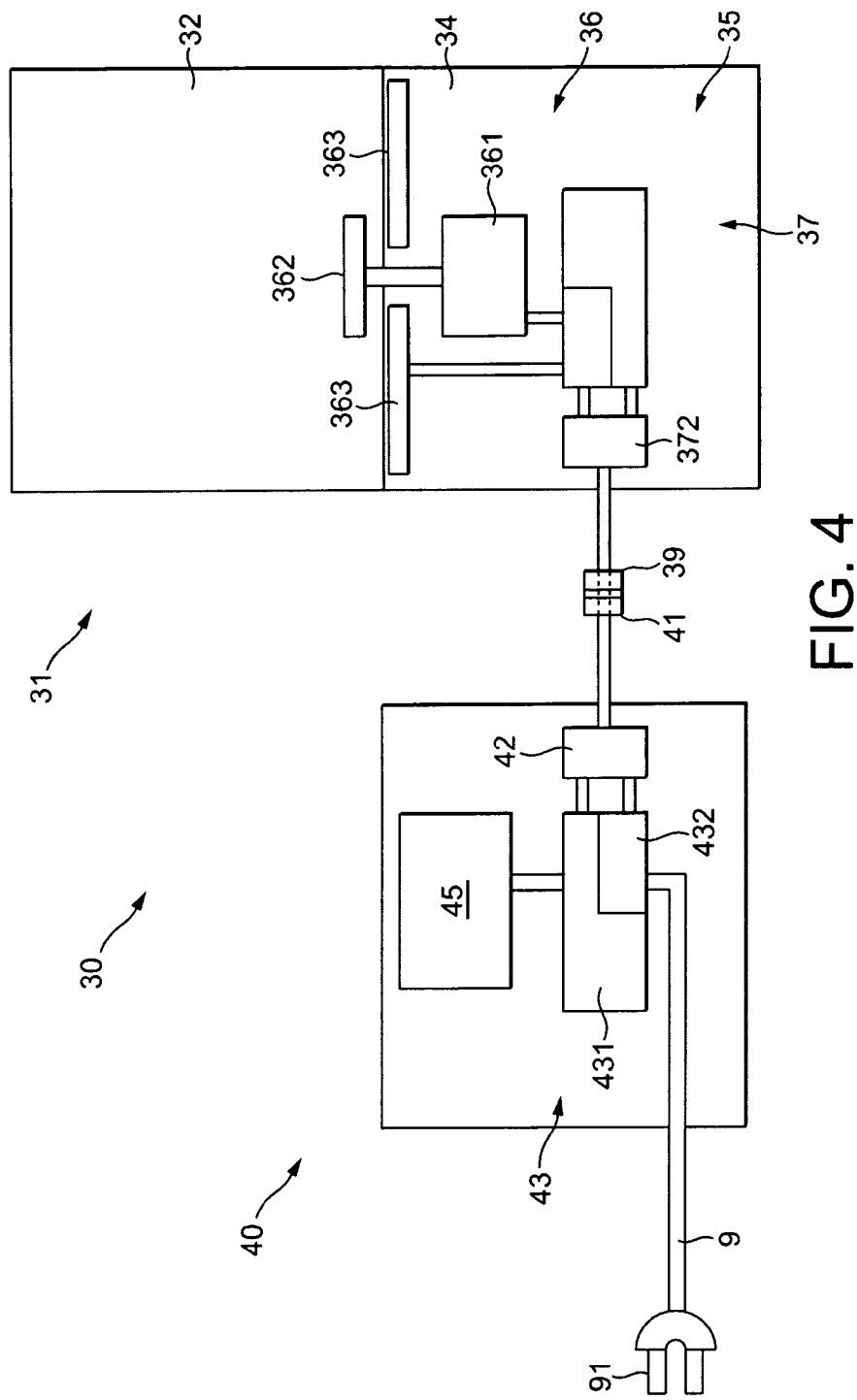
FIG. 4 schematically illustrates the different functions of an apparatus according to the invention.

Hence, apparatus 30 includes a food conditioning module 31 that has a structure for holding the food substance, such as a tank 32 with a spout 321 and removable lid 322. Tank 32 may be held by an outer stand 32' forming a container having with tank 32 a common mouth 323. For instance, tank 32 and stand 32' are welded together at their mouth. As schematically illustrated in FIG. 4, apparatus 30 has an electric device 35 for imparting a conditioning effect to such food substance, e.g. milk. Electric device 35 may include a conditioner 36, e.g. a motor 361 for driving an impeller 362 in tank 32 and a resistive heater 363 for heating the content of tank 32 typically via a wall or bottom thereof. Electric device 35 further includes a conditioner control unit 37 for controlling conditioner. The electric device can be at least partly housed in a cavity delimited by a chamber 34 adjacent to tank 32. The cavity may be formed between tank 32, e.g. an outside surface thereof, and stand 32', e.g. an inside surface thereof.

Furthermore, apparatus 30 has a user-interface device 40 in data-communication with conditioner control unit 37 to transmit user-data from user-interface device to control unit 37 for controlling conditioner 36 accordingly. In accordance with the invention, user-interface device 40 is external to food conditioning module 31 and disconnectably connected thereto. User-interface device 40 includes a user-interface 45 in the form of a turn-and-push button. The selection by a user of a particular food conditioning program may be carried out by turning button 45. The request by a user to initiate the conditioning program may be carried out by pushing button 45. Other user-interfaces are of course contemplated, e.g. toggle switches, touch pads, touch screens, multiple buttons, etc. . . . .

User-interface device 40 is comprised in a base station 7, e.g. delimited by housing 2, for removably receiving food conditioning module 31 thereon.

Base station 7 is connectable to an AC electric power source, such as the mains, via cable 9 bearing a electric plug 91. Base station 7 and food conditioning module 31 comprise disconnectably connectable electric power connectors 39,41 for passing electric power from base station 7 to electric device 35 of module 31, in particular to conditioner 36 and to conditioner control unit 37. Power connectors 39,41 may be in the form of STRIX® connectors to facilitate removal of module 31 from base station 7, e.g. upon conditioning the food substance contained therein and dispensing from spout 321.

User-interface device 40 can be in data-communication with conditioner control unit 37 via electric power connectors 39,41.

Base station 7 and food conditioning module 31 comprise a base modulation device 42 and a module modulation device 372, respectively. Modulation devices 372,42 are arranged to combine and/or separate electric power and data passed via electric power connectors 39,41. As illustrated in FIG. 4, electric power is supplied from electric cable 9 to interface device 40. Interface device 40 has a control unit 43 including a PCB with a low power module 431 and a high power module 432. Electric power supplied from the mains via and cable 9 is converted via an AC/DC converter on high power module 432 to power low power module 431, e.g. bearing a controller, a clock, memory, etc. . . . and connected to user-interface 45. Furthermore, high power module 432 feeds electric power through connectors 39,41 and via modulation device 42 into modulation device 372 of conditioning module 31.

Data representative of user-instructions read at user-interface 45 from user-input are transmitted to control unit 43 which controls modulator 42 for modulating according to this data the electric power passed via connectors. Modulator 372 demodulates the data from the electric power, the electric power being used to power electric device 35, in particular conditioner 36 and control unit 37, the data being supplied to control unit 37 of conditioning module 31. Control unit 37 has a low power circuit 371 and a high power 372 with an AC/DC converter. The low power circuit, e.g. bearing a controller, a clock, a memory device, etc. . . . , controls the supply of electric power to conditioner 36 in accordance with the data supplied from user-interface device 40 via connectors 39,41 and food processing programs stored in control unit 37.

For instance, modulation devices 42,372 each includes: a power switch for interrupting the electric power passed via connectors 39,41 to generate electric data by sequences of interruptions; and a power sensor for detecting such interruptions in the electric power pass via the connectors. For instance, the power sensor is an ammeter, e.g. a Hall sensor. In this manner bidirectional communication can be achieved in a simple manner. If only unidirectional communication is needed, a power switch can be provided as modulator 42 for superimposing data on the supplied electric power and a power sensor can be provided as demodulator 372 to read the data.

Typically, control unit 43 of user-interface device 40 is a master and control unit 37 is a slave in the data communication between device 40 and module 31.

Short interruptions of power resulting from the encoding of data into the electric power does not significantly interfere with the normal operation. The AC/DC converter will dampen the short interruptions so that the low power part of the control unit 37 will not be affected, the inertia of thermal resistor 363 and the motor 361 will absorb these interruptions. Moreover, the data transmission typically takes place to trigger a food conditioning process, i.e. prior to operating the conditioner 36 which is then typically controlled by controller 37 after data communication (and resulting power interruptions) has taken place so that no, or no significant, power-interruptive data communication takes place during food conditioning.

Figure 5:
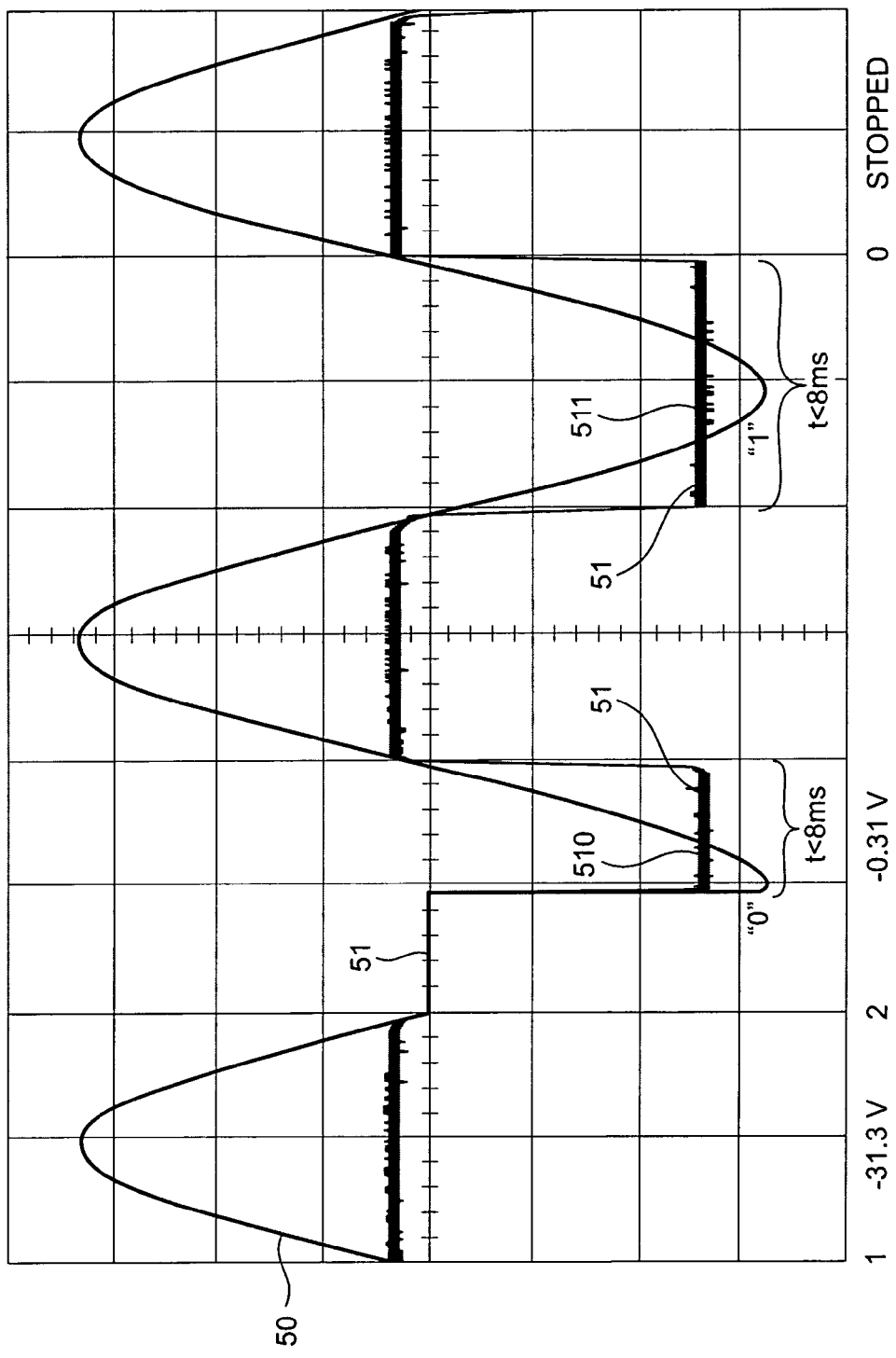
FIG. 5 is a chart illustrating an AC powering and data communication in an apparatus according to the invention.

FIG. 5 illustrated the voltage of the electric power passed via electric connectors 39,41 upon modulation by modulation device 42. Sinusoidal curve 50 illustrates the voltage of the electric power passed via electric connectors 39,41 and square curve 51 illustrates binary data superimposed on the electric power.

Data communication is carried out on the negative part of sinusoidal wave 50, i.e. on a half-wave of the mains' voltage. Data communication can be achieved sequentially, bit by bit. When the negative part of a sinusoidal wave is interrupted for more than 20%, i.e. more than 2 ms for a 50 Hz electric powering, the transmitted bit 510 is deemed to be a "0". When the negative part of the sinusoidal phase is interrupted for less than 20%, i.e. less than 2 ms, the transmitted bit 511 is deemed to be a "1". Alternatively, the data may also be modulated into the positive part of the waves. A timer may be used to measure the length of the interruptions. The detected bits may be stored in a register (memory) of the control unit to which it is destined.

In practice, the master device 432 first switches on the AC switch 42 and provides the AC supply voltage for the slave 37. In this manner slave 37 is powered up and can boot up automatically. After booting slave 37 starts a zero crossing detection via current sensor 372 and waits for data (instructions) from master 43. After a predetermined period of time, master 43 sends a series of bits to slave 37 by modulating the fed electric power by means of modulation device 42, e.g. a current switch, and starts the current detection. When the information is received by slave 37, the slave starts working accordingly and runs the programs associated with the received information. After having carried out the programs, the slave modulates the current consumption to transfer status information detectable by the master device via modulation device 42, e.g. a current sensor. The current can be modulated by slave 37 by switching on and off some internal power load normally used for other functions, e.g. motor 361 or heater 363, and detected by a current sensor associated with modulation device 42.

In a variation, data may be communicated between module 31 and interface device 40 via dedicated connectors or wireless.

When apparatus 30 is incorporated in a beverage preparation machine 1, e.g. as illustrated in FIGS. 1 to 3, control unit 43 may be used to control food conditioning module 31 and the beverage preparation module contained in housing 2. In this case, user-interface 20 and master switch 23 can be connected to control unit 43.

The invention claimed is:

1. An apparatus for conditioning a food substance comprising:
   a food conditioning module that has a structure for holding the food substance, an electromechanical stirrer for imparting a conditioning effect to the food substance, and a control unit for controlling the electromechanical stirrer; a user-interface device in data-communication with the control unit for transmitting user-data from the user-interface device to the control unit for controlling the electromechanical stirrer accordingly; and a base station for removably receiving the food conditioning module thereon and comprising the user-interface device, the user-interface device being external to the food conditioning module and disconnectably connected thereto.

2. The apparatus of claim 1, wherein the base station is connectable to an AC electric power source, the base station and the food conditioning module comprising disconnectably connectable electric power connectors for transmitting electric power from the base station to the electromechanical stirrer of the module.

3. The apparatus of claim 2, wherein the user-interface device is in data-communication with the control unit via the electric power connectors.

4. The apparatus of claim 3, wherein the base station and the food conditioning module comprise a base modulation device and a module modulation device, respectively, the modulation devices being arranged to combine and/or separate electric power and data transmitted via the electric power connectors.

5. The apparatus of claim 4, wherein at least one of the modulation devices includes a power switch for interrupting the electric power to generate electric data.

6. The apparatus of claim 4, wherein at least one of the modulation devices includes a power sensor for measuring modulation-resulting variations of the electric power to derive electric data from such modulation.

7. The apparatus of claim 1, comprising a disconnectably connectable electric data connector for placing the user-interface device in data-communication with the control unit.

8. The apparatus of claim 1, wherein the user-interface device is in wireless data-communication with the control unit.

9. The apparatus of claim 1, wherein the user-interface device comprises an interface control unit forming a master and wherein the control unit forms a slave, or vice versa.

10. The apparatus of claim 1, wherein the food conditioning module comprises an electrical heating and/or cooling arrangement.

11. The apparatus of claim 1, wherein the food holding structure comprises a tank for containing the food substance in the form of a liquid and/or an emulsion, at least part of the electromechanical stirrer being located outside the tank.

12. A beverage preparation machine comprising:
    an apparatus for conditioning a food substance comprising:
    a food conditioning module that has a structure for holding the food substance, an electromechanical stirrer for imparting a conditioning effect to such food substance, and a control unit controlling the electromechanical stirrer; a user-interface device in data-communication with the control unit for transmitting user-data from the user-interface device to the control unit for controlling the electromechanical stirrer accordingly; and a base station for removably receiving the food conditioning module thereon and comprising the user-interface device, the user-interface device being external to the food conditioning module and disconnectably connected thereto with a beverage preparation module and a chamber for receiving a flavoring ingredient, such as a pre-portioned ingredient contained in a capsule, and a liquid circulation system for circulating a liquid through the chamber containing the ingredient and forming a flavored beverage dispensed via a beverage outlet.

13. The beverage preparation machine of claim 12 having a housing containing at least part of the beverage preparation module, the housing bearing a user-interface of the user-interface device and a connector for disconnectably connecting and powering the food conditioning module removably mounted on the connector.

* * * * *